UNITED STATES PATENT OFFICE.

FÉLIX JOURDAN, OF ROME, ITALY.

PROCESS FOR OBTAINING IN SOLUBLE STATE SOME OF THE CONSTITUENTS OF COMPLEX ROCKS.

1,417,831.     Specification of Letters Patent.     Patented May 30, 1922.

No Drawing.     Application filed December 22, 1920. Serial No. 432,614.

*To all whom it may concern:*

Be it known that I, FÉLIX JOURDAN, a citizen of the French Republic, residing at Rome, in the Kingdom of Italy, have invented certain new and useful Improvements in Processes for Obtaining in Soluble State Some of the Constituents of Complex Rocks, of which the following is a specification.

This invention relates to a process for treating complex rocks or minerals and particularly potassic rocks for the purpose of obtaining some of their constituents in soluble form.

When complex rocks or minerals are treated with suitable acids, a mixture of soluble salts not easily separable when in solution is obtained.

The present invention takes advantage of the fact when some of the salts of said mixture are submitted to a suitable temperature and pressure, they are decomposed, evolving gaseous products, which can be eliminated. The insoluble residues resulting from said decomposition and remaining in the mixture with the non-decomposable salts, can be separated therefrom by washing and lixiviation. In such way the separation of the soluble from the insoluble parts can be effected.

The present process, which can be conveniently applied to many and different cases in which minerals of a complex nature are to be treated, will in the following be described more fully with reference to the extraction of potassium salts from potassic rocks given by way of example.

Leucite or, more generally speaking, a leucitic rock usually containing in addition to potash and soda, which are the useful constituents, also silica, alumina, oxide of iron, lime and magnesia, can be attacked with a strong acid, such as hydrochloric, nitric or sulphuric acid, producing at low temperature the salts corresponding to the elements contained in the parts of the rocks actually attacked.

It is evident that instead of said acids also chlorine or hot sulphurous anhydride with or without the addition of water (steam) may be used, and in general any substance or mixture of substances adapted to produce an acid capable of attacking the useful constituents contained in the rock.

For instance, employing gaseous hydrochloric acid and water (steam) at a suitable temperature, a mixture of the chlorides of aluminium, iron, calcium, magnesium, sodium and potassium will be obtained.

These soluble chlorides can be easily separated from the residual inert part of the rock; however their separation from one another is not easy. Some of these salts are of no great value while others are inconvenient, inasmuch as their formation would require the consumption of a considerable quantity of acid which would be a total loss.

According to the present invention the separation can be effected by exposing the mixture of salts obtained as above mentioned either in a dry state or in the presence of water (steam) to a temperature at which the salts of some of the constituents, especially those of useless and inconvenient elements will dissociate or decompose, insoluble compounds being formed, whilst the salts which are to be extracted remain unaltered and in the soluble state.

In the particular case herein dealt with for the treatment of leucitic rocks, by raising the temperature of the mass to dark red, i. e., to between 300° and 600° C., and by treating the mass in the presence of water (steam), the chlorides of aluminium, iron and magnesium are entirely decomposed, the chloride of calcium is partially decomposed, all leaving an insoluble residue, whilst the potassium and sodium chlorides remain unaltered.

Thus nearly the whole of the useless constituents remain as residue with the inert rock.

The acid obtained by the decomposition of said unstable chlorides may be collected and used over again, so that only small amounts thereof are lost, this contributing towards the economy of the process.

This fact taken together with the low decomposition temperature of the chlorides makes the use of hydrochloric acid preferable to other acids.

In practice, the above operations can be effected in any suitable apparatus, and the different conditions under which the operation is to be effected can be met by those skilled in the art.

Nevertheless in the following, by way of example, a simple and economical method will be described which will be found to be most convenient in the majority of cases.

The leucitic rock, or any other material to be treated, is introduced into a tubular furnace with an internal acid proof refractory lining. The material is caused to traverse said furnace from the feeding end to the discharge end, either by means of a screw conveyor or by the rotary movement of the furnace the axis of which in this case would be arranged in an inclined position, as is usual in tubular revolving cement furnaces and the like.

The acid vapours are caused to enter in a direction opposite to that of the material under treatment.

The furnace zone where the acid gases enter is heated to about 600° C.

The rock in the form of powder is introduced at one end and caused to advance slowly to meet the gaseous current entering the other end. The water vapours and the acid vapours on coming into contact with the pulverized rock, entering the furnace, will condense thereon so that the attack and solution process begins, and this process will continue to develop during the progress of the material within the furnace. The speed of such progress is regulated in such a way that the attack is fully effected in the first zone of entering. Thereupon the attacked material enters the zone of an elevated temperature, wherein the salts formed in the prior zone are partially decomposed. This decomposition may be effected in the same tubular furnace in which the previous treatment is effected or in an independent tube.

The soluble potassium and sodium salts together with the inert residue of the rock and the insoluble compounds of the other constituents attacked issue from the discharge end of the tube.

For the carrying out of the above process a certain quantity of hydrochloric acid has to be consumed, which, if it were produced by the Heargraves process, would also produce a certain quantity of sodium sulphate which would be useless for the process. In order to avoid this and to cheapen the process, regard is taken to the circumstance that potassium chloride produced in the process itself is disposed of. The process for the production of hydrochloric acid is therefore modified as follows:

(a) The apparatus for the production of hydrochloric acid is fed with potassium chloride, the sulphurous anhydride being sprinkled thereupon.

(b) The apparatus itself is used without any cooling means and consists only of a plain reaction vessel, the warm vapours evolved during the reaction being directly led into the tubular furnace containing the rock to be treated, thus the exothermic heat produced in the formation of the potassium sulphate is made use of for the present process.

Claims—

1. Process of obtaining in soluble state some of the constituents of complex potassic rocks containing also salts of iron, aluminum, calcium and magnesium, which consists in attacking said rocks with hydrochloric acid, using a temperature of 300° to 600° C., and recovering the hydrochloric acid.

2. In the process as specified in claim 1, the use of a furnace, and the steps of introducing therein at its one end the rock, causing it to progressively pass toward the discharge end of said furnace, at the same time admitting acid vapors at the discharge end of the furnace and causing them to flow counter to the path of the rock, and producing heat at the discharge end of the furnace so as to decompose the salts formed by the said acid vapors, the latter passing through the furnace to attack the rock as it is introduced into the said furnace.

In testimony whereof I affix my signature in the presence of two witnesses at Rome this 29th day of November, 1920.

FÉLIX JOURDAN.

Witnesses:
 LETTERN LABRUELLA,
 WILHELM SCHMID.